United States Patent
Liu et al.

(10) Patent No.: US 8,294,379 B2
(45) Date of Patent: Oct. 23, 2012

(54) DIMMABLE LED LAMP AND DIMMABLE LED LIGHTING APPARATUS

(75) Inventors: Kwang-Hwa Liu, Sunnyvale, CA (US); Cheng-Nan Wu, Keelung (TW)

(73) Assignee: Green Mark Technology Inc., New Taipei (TW)

( * ) Notice: Subject to any disclaimer, the term of this patent is extended or adjusted under 35 U.S.C. 154(b) by 346 days.

(21) Appl. No.: 12/616,099

(22) Filed: Nov. 10, 2009

(65) Prior Publication Data

US 2011/0109249 A1    May 12, 2011

(51) Int. Cl.
*H05B 37/02* (2006.01)

(52) U.S. Cl. ......... 315/224; 315/306; 315/308; 315/360

(58) Field of Classification Search .............. 315/209 R, 315/224, 283, 291, 306, 308, 360; 307/116, 307/125, 119, 126, 139, 140
See application file for complete search history.

(56) References Cited

U.S. PATENT DOCUMENTS

| | | |
|---|---|---|
| 3,979,601 A | 9/1976 | Franklin |
| 4,253,045 A | 2/1981 | Weber |
| 4,300,090 A | 11/1981 | Weber |
| 4,336,464 A | 6/1982 | Weber |
| 4,344,000 A | 8/1982 | Schornack et al. |
| 4,365,167 A | 12/1982 | Weimer et al. |
| 4,439,688 A | 3/1984 | Schornack |
| 4,494,012 A | 1/1985 | Coker |
| 4,504,778 A | 3/1985 | Evans |
| 4,521,843 A | 6/1985 | Pezzolo et al. |
| 4,556,863 A | 12/1985 | Devitt et al. |
| 4,570,216 A | 2/1986 | Chan |
| 4,649,323 A | 3/1987 | Pearlman et al. |
| 4,695,739 A | 9/1987 | Pierce |
| 4,730,184 A | 3/1988 | Bach |
| 4,733,138 A | 3/1988 | Pearlman et al. |
| 4,754,213 A | 6/1988 | Dubot et al. |
| 4,776,514 A | 10/1988 | Johnstone et al. |
| 4,878,010 A | 10/1989 | Weber |

(Continued)

FOREIGN PATENT DOCUMENTS

JP    2009016104    1/2009

(Continued)

OTHER PUBLICATIONS

"Search Report of European Counterpart Application", issued on Mar. 10, 2011, p. 1-p. 6.

(Continued)

*Primary Examiner* — Thuy Vinh Tran
(74) *Attorney, Agent, or Firm* — Jianq Chyun IP Office

(57) ABSTRACT

A dimmable light-emitting diode (LED) lamp and a dimmable LED lighting apparatus thereof are provided. The dimmable LED lamp includes a bridge rectifier, a toggle detector, a sustain voltage supply circuit, a counter, an LED light source, and an LED lighting driver. The bridge rectifier receives a source alternating current (AC) voltage through a wall switch and provides a rectified direct current (DC) voltage. The toggle detector monitors a toggle action of the wall switch. The sustain voltage supply circuit provides a sustain voltage. The counter receives the sustain voltage for operation. Moreover, the counter stores and provides an counting value that changes when the toggle detector detects the toggle action. The LED lighting driver converts the rectified DC voltage to a constant current to drive the LED light source. The LED lighting driver also provides multi-level dimming to the LED light source according to the counting value.

15 Claims, 10 Drawing Sheets

U.S. PATENT DOCUMENTS

| | | | |
|---|---|---|---|
| 4,889,999 | A | 12/1989 | Rowen |
| 4,924,109 | A | 5/1990 | Weber |
| 5,015,994 | A | 5/1991 | Hoberman et al. |
| 5,030,890 | A | 7/1991 | Johnson |
| 5,081,411 | A | 1/1992 | Walker |
| 5,153,560 | A | 10/1992 | Ichikawa |
| 5,191,265 | A | 3/1993 | D'Aleo et al. |
| 5,262,678 | A | 11/1993 | Flowers et al. |
| 5,283,516 | A | 2/1994 | Lohoff |
| 5,304,781 | A | 4/1994 | Stalsberg |
| 5,373,218 | A | 12/1994 | Konopka et al. |
| 5,430,356 | A | 7/1995 | Ference et al. |
| 5,473,204 | A | 12/1995 | Temple |
| 5,485,058 | A | 1/1996 | Watson et al. |
| 5,504,394 | A | 4/1996 | Johnson |
| 5,530,301 | A | 6/1996 | Fu et al. |
| 5,585,699 | A | 12/1996 | Schulz |
| 5,586,048 | A | 12/1996 | Coveley |
| 5,736,795 | A | 4/1998 | Zuehlke et al. |
| 5,872,832 | A | 2/1999 | Bishel et al. |
| 6,174,073 | B1 | 1/2001 | Regan et al. |
| 6,225,760 | B1 | 5/2001 | Moan |
| 6,356,038 | B2 | 3/2002 | Bishel |
| 6,490,174 | B1 | 12/2002 | Kompelien |
| 6,700,333 | B1 | 3/2004 | Hirshi et al. |
| 6,759,966 | B1 | 7/2004 | Weng |
| 6,933,686 | B1 | 8/2005 | Bishel |
| 7,012,518 | B2 | 3/2006 | Novikov |
| 7,116,056 | B2 | 10/2006 | Jacoby, Jr. et al. |
| 7,190,125 | B2 * | 3/2007 | McDonough et al. ........ 315/291 |
| 7,211,968 | B2 | 5/2007 | Adamson et |
| 7,235,933 | B1 | 6/2007 | So |
| 7,355,523 | B2 | 4/2008 | Sid |
| 7,446,671 | B2 | 11/2008 | Giannopoulos et al. |
| 7,476,988 | B2 | 1/2009 | Mulhouse et al. |
| 7,579,717 | B2 * | 8/2009 | Blair et al. .................... 307/141 |
| 7,663,325 | B2 * | 2/2010 | McDonough et al. ........ 315/291 |
| 7,859,136 | B2 * | 12/2010 | Blair et al. .................... 307/141 |
| 2008/0297068 | A1 | 12/2008 | Koren et al. |
| 2008/0316781 | A1 | 12/2008 | Liu |
| 2011/0080105 | A1 * | 4/2011 | Mayer et al. .................. 315/250 |

FOREIGN PATENT DOCUMENTS

JP    2009110914    5/2009

OTHER PUBLICATIONS

DI-171 Design Idea LinkSwitch-TN "Low Cost Dimmable LED Ballast Using the Valley Fill Current Shaping Circuit," Power Integrations, Mar. 2008.

Supertex inc. HV9930 "Hysteretic Boost-Buck (Ćuk) LED Driver IC" www.supertex.com, pp. 1-7.

National Semiconductor LM3445 "Triac Dimmable Offline LED Driver" www.national.com, Oct. 9, 2009, pp. 1-26.

"Office Action of Japan Counterpart Application", issued on Feb. 28, 2012, p. 1-p. 2.

* cited by examiner

DIMMABLE LED LAMP AND DIMMABLE LED LIGHTING APPARATUS

BACKGROUND OF THE INVENTION

1. Field of the Invention

The present invention relates to a light-emitting diode (LED) lamp and its LED lighting apparatus. More particularly, the present invention relates to the multi-level dimming of an LED lamp and its LED lighting apparatus.

2. Description of the Related Art

Lighting dimmer can save energy, but due to the extra cost in installing various types of electronic dimmers, most incandescent lamps and energy-saving lamps, including compact fluorescent lamps and the emerging LED lighting, are not equipped with any dimming measures. In use, they are either fully turned on, or fully turned off. In the majority of situation, for safety concern, it is highly desirable to be able to dim the light, instead of completely turning it off. Shopping malls, stores, schools, hospitals, small offices, hallways, stairways, factories, and warehouses are examples where partially dimmed lighting is strongly desired during after-work or night hours.

A triac dimmer can retrofit a single-pole single-throw (SPST) wall switch without the need to change the existing wall-switch wiring system. In other words, no re-wiring is required. A triac dimmer works by essentially chopping off some part of the AC voltage. This allows the other part of the AC voltage to pass to the lamp. The brightness of the LED lamp is determined by the amount of power transferred to it, so the more the AC voltage is chopped off, the more it dims.

A Triac is basically a three-terminal, solid-state device that operates directly from AC line. When a short pulse current is injected into the gate terminal, a triac is "turned-on", that is, it can conduct current until the end of the present half-cycle. Assuming the load is largely resistive, as in the case of a incandescent lamp, the triac will resume its off state (commutate itself off) as the load current drops to zero when the ac voltage crosses the zero level at the end of each half-cycle.

FIG. 1 is a schematic diagram showing a conventional triac dimming circuit 20 for an incandescent lamp 10. Dimmer circuit 20 is inserted between the SPST wall switch 12 and the AC1 power line. Resistor R23 and capacitor C24 determine a delay time after a zero-crossing of the AC line voltage. R23 is a variable resistor. The user may control the aforementioned delay time by adjusting R23. Before triac 25 is turned on, there is essentially no current, except a small current flowing through R23 to charge C24. This small current also flows through lamp 10, which has a resistance of several hundred ohms. After a delay time (determined by R23*C24), the voltage across C24 has reached a sufficiently high value, e.g. 30V to cause diac 26 to break down into a low-resistance state. The break-down of diac 26 provides a short current-pulse into the gate terminal (GT) of triac 25, and turns it into a conduction state.

FIG. 2 is a schematic diagram showing some important signals in the conventional triac dimming circuit 20 in FIG. 1. As shown in FIG. 2, by increasing the delay time, one can reduce the conduction angle, $\phi$, of the triac, thereby control the amount of current or power to lamp 10. This scheme of adjusting the delay time ($\pi-\phi$) to regulate the power available to the load is also known as phase control.

After the firing of triac 25, the voltage across the terminals MT1 and MT2 of the triac drops essentially to zero. Any remaining voltage on C24 is discharged through R23 and triac 25. Please notice that the maximum conduction angle is less than 180 degrees, since there always requires some delay time to allow C24 to accumulate some charge to trigger diac 26.

Conventional triac dimmers have some drawbacks. (1) It degrades the power factor of the lighting fixture when using a triac dimmer. If the dimmer is set to very dim light condition, the lighting fixture's power factor can be as low as 0.20, or worse.

(2) Triac dimmers generate electro-magnetic interference (EMI) and buzzing sound due to the abrupt turning on the triac in the middle of an AC cycle. Usually some EMI filter means is necessary to suppress the EMI noise from reaching and affecting the operation of other electric or electronic appliances connected to the same wiring system. FIG. 1 shows a typical EMI filter using a capacitor 21 and an inductor 22.

(3) The triac dimmer was originally designed to control a resistive load such as the incandescent lamp. The incandescent lamp emits light through heating its tungsten filament to over 3,000 degrees centigrade. Chopping off some portion of the AC voltage will not appear flickering to human eyes because the filament temperature will not fluctuate even when the AC voltage is pulsating at 60 Hz/120 Hz. However, dimming will make an incandescent lamp operate at lower temperature and emit reddish light.

(4) The triac dimmer is usually NOT compatible with most fluorescent lamps and CFLs (compact fluorescent lamps). It often causes flickering or outright lamp damage. In fact, fluorescent lamps are notoriously difficult to dim.

(5) The triac dimmer is also NOT compatible with most LED lighting fixtures. An LED emits light only when it is conducting a forward current. Once the current is turned off, it stops emitting light immediately. So a chopped AC voltage waveform by using a triac dimmer will result in visible flickers when the conduction angle is less than 90 degrees.

FIG. 3 is a schematic diagram showing a conventional electronic dimmer using an infra-red (IR) remote control system. A conduction modulator 31 is used to vary the power to a lamp 35. An AC/DC power supply 32 provides a DC voltage to an IR receiver 33 and conduction time modulator 31. IR receiver 33 responds to the dimming level command issued by an IR remote controller 36. Please notice that remote controller 36 requires a battery to supply the operating voltage to run its internal circuitry.

Electronic dimmers using infra-red or wireless remote control can provide dimming as well as other sophisticated control functions such as operating time scheduling. It can circumvent the limitations of triac dimming circuits and can support the dimming of fluorescent lamps and LED lamps. But all of these benefits come at a considerably high cost, including (a) extra cost in adding an IR or wireless receiver and a decoder circuit to each lamp. (b) The remote controller unit needs some DC voltage source, such as a battery. (c) The controller is prone to be misplaced, abused, or stolen.

LED lighting is generally operated at a constant current condition. For off-line applications, a buck converter can be used to convert the rectified AC voltage to the constant DC current required by the LED lamp. FIG. 4 is a schematic diagram showing an LED lighting driver 40 based on a buck converter. LED driver 40 includes a switching controller 50, an inductor 47, a free-wheeling diode 48, a power metal-oxide-semiconductor field-effect transistor (MOSFET) 45, and a current sense resistor 46.

MOSFET 45 turns on when a high-frequency clock 53, typically running at over 50 kHz, issues a pulse to set the SR flip-flop 54. Gate driver 55 amplifies the output of SR flip-flop 54 to drive power MOSFET 45. With MOSFET 45 turning on, current flowing through LED lamp 49 and inductor 47 builds up higher. The LED current level is sensed by sensing resistor 46. When the sense voltage across resistor 46 exceeds the reference voltage VREF, comparator 56 resets the output of flip-flop 54. MOSFET 45 turns off accordingly. The inductive LED current flows through diode 48. Inductor current starts to decay until the next clock pulse. By repetitively turning on and off MOSFET 45 at high frequency, the LED current is regulated at a constant level set up by the reference voltage VREF.

Switching controller 50 also includes a dimming circuit, which includes a dimming sawtooth generator 51 and an analog comparator 52. Dimming sawtooth generator 51 typically provides a pulse-width modulation (PWM) dimming frequency (i.e. the dimming sawtooth wave) in the range of 100 Hz to 1 kHz. The dimming voltage VDIM is provided by, for example, an infra-red receiver such as the one shown in FIG. 3.

Changing the level of the dimming voltage VDIM can modulate the conduction time of the LED driver as shown in FIG. 5. From T1 to T2, VDIM is set up at a higher level, for example, 4.5V. The MOSFET is in switching mode all the time. After T2, VDIM level is reduced to 2.0V. When the dimming sawtooth wave rises above the 2.0V VDIM level, at T3, the output of comparator 52 goes low. This will cause AND gate 57 to inhibit clock 53 from setting flip-flop 54. Therefore, the switching operation of MOSFET 45 stops.

At T4, the sawtooth wave drops to zero, and the output of comparator 52 goes high again, enabling clock 53 to set flip-flop 54. Please notice that the duty cycle or the proportion of MOSFET 45 in switching mode during the period from T2 and T4 (i.e. the switching duty cycle of MOSFET 45) is 50%. After T4, VDIM level is further lowered to 1.0V. Likewise, the switching duty cycle of MOSFET 45 during the period from T4 to T6 is 25%. Further reducing VDIM level to 0.5V will cut down the switching duty cycle to 12.5%.

The bias voltage supply circuit 41 includes a bias winding 44 which is coupled to inductor 47. The AC voltage induced by bias winding 44 is rectified and smoothed by a diode 43 and a capacitor 42. Capacity 42 holds sufficient charge to maintain the buck converter in a standby condition when the PWM dimming inhibits the switching of the buck converter periodically. A start up resistor Rst is connected between the voltage VDC and capacitor 42. Resistor Rst helps to kick start LED lighting driver 40 when an AC supply is connected to the LED lamp 49 and the driver circuit initially.

However, conventional dimming control methods using triac device or IR remote control all have some drawbacks. Triac dimmers are relatively low-cost and easy to install, but they are not compatible with LED lighting by their nature. On the other hand, it is clear the bottleneck for other dimming schemes is the extra hardware and cost in transmitting the VDIM information to the LED lighting drivers.

SUMMARY OF THE INVENTION

Accordingly, the present invention is directed to a low-cost dimmable LED lamp and a low-cost dimmable LED lighting apparatus of the LED lamp. The LED lamp does not need re-wiring or any retrofit work to the ordinary wall switch. The LED lamp does not need a triac dimmer or any extra dimmer hardware. The LED lamp does not need an infra-red or wireless remote controller. The LED lamp uses a regular wall switch to control the dimming. The entire dimming function can be built into the LED lighting driver of the LED lamp. In other words, the dimmable LED lamp can be built with the same form factor as a conventional light fixture such as A19, PAR30, PAR38, etc. The LED lamp can maintain very high power factor (higher than 0.95) at any dimming level. Moreover, the dimmable LED lighting apparatus can be implemented to control other household electrical devices, such as controlling the speed of a ceiling fan or the thermostat of an air conditioner.

According to an embodiment of the present invention, a dimmable LED lamp is provided, which includes a bridge rectifier, a toggle detector, a sustain voltage supply circuit, a counter, an LED light source, and an LED lighting driver. The bridge rectifier receives a source AC voltage through a wall switch and provides a rectified DC voltage. The toggle detector monitors a toggle action of the wall switch. The sustain voltage supply circuit provides a sustain voltage. The counter receives the sustain voltage for operation. Moreover, the counter stores and provides an counting value that changes when the toggle detector detects the toggle action of the wall switch. The LED lighting driver converts the rectified DC voltage to a constant current to drive the LED light source. The LED lighting driver also provides multi-level dimming to the LED light source according to the counting value.

According to another embodiment of the present invention, a dimmable LED lighting apparatus is provided. The dimmable LED lighting apparatus includes the toggle detector, the sustain voltage supply circuit, the counter, and the LED lighting driver of the aforementioned dimmable LED lamp.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
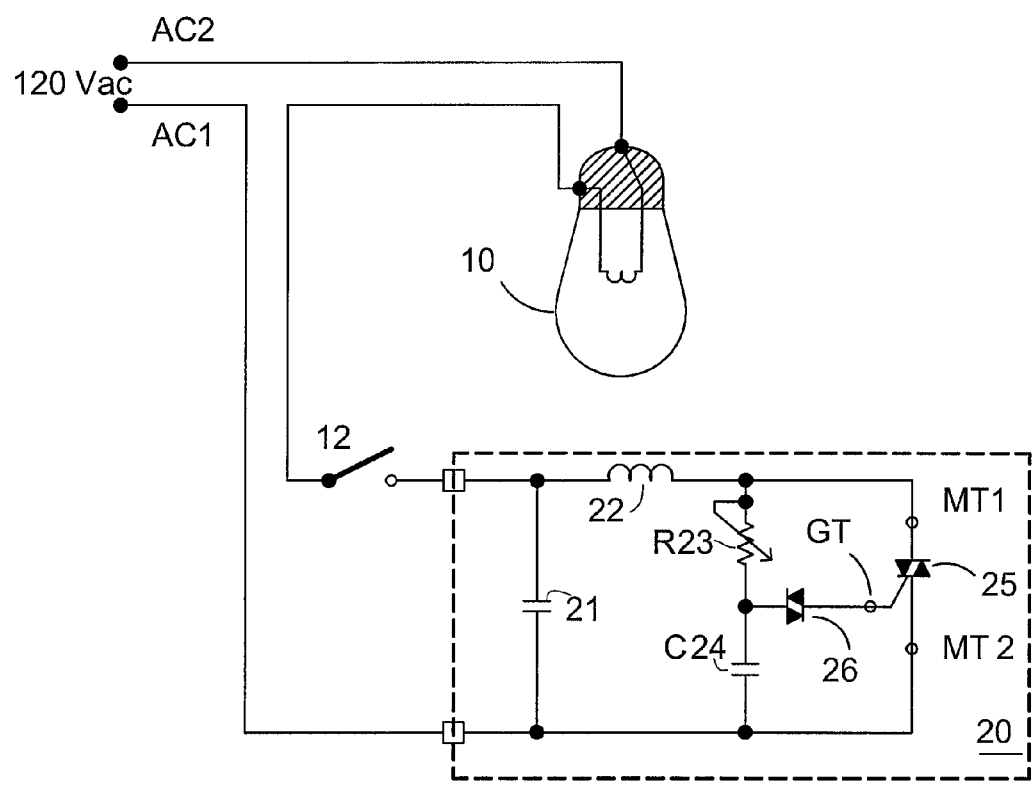
FIG. 1 is a schematic diagram showing a conventional triac dimming circuit.
Figure 2:
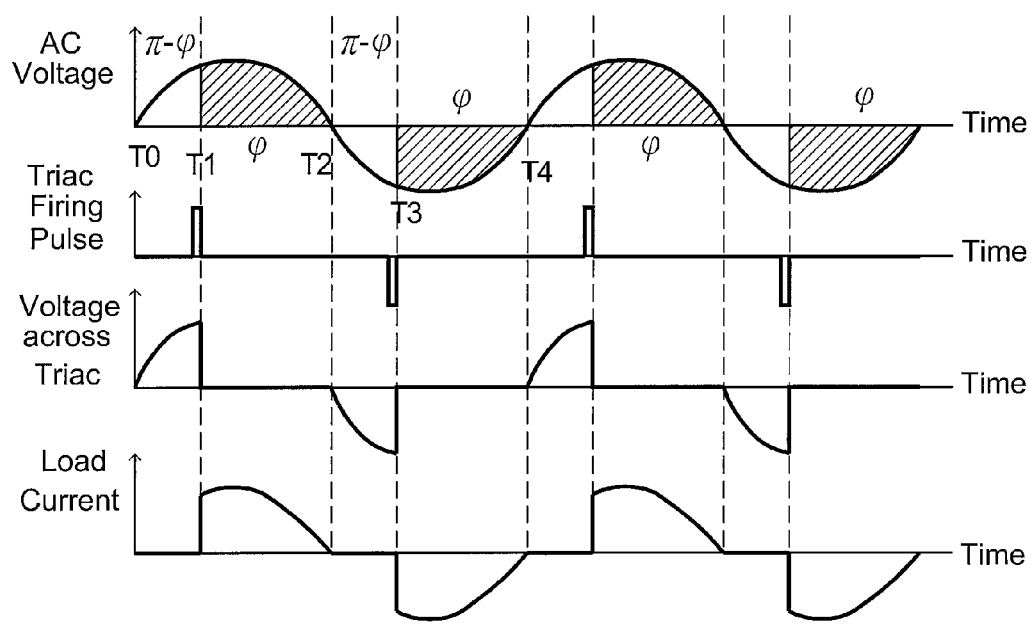
FIG. 2 is a schematic diagram showing some important signals in the conventional triac dimming circuit in FIG. 1.
Figure 3:
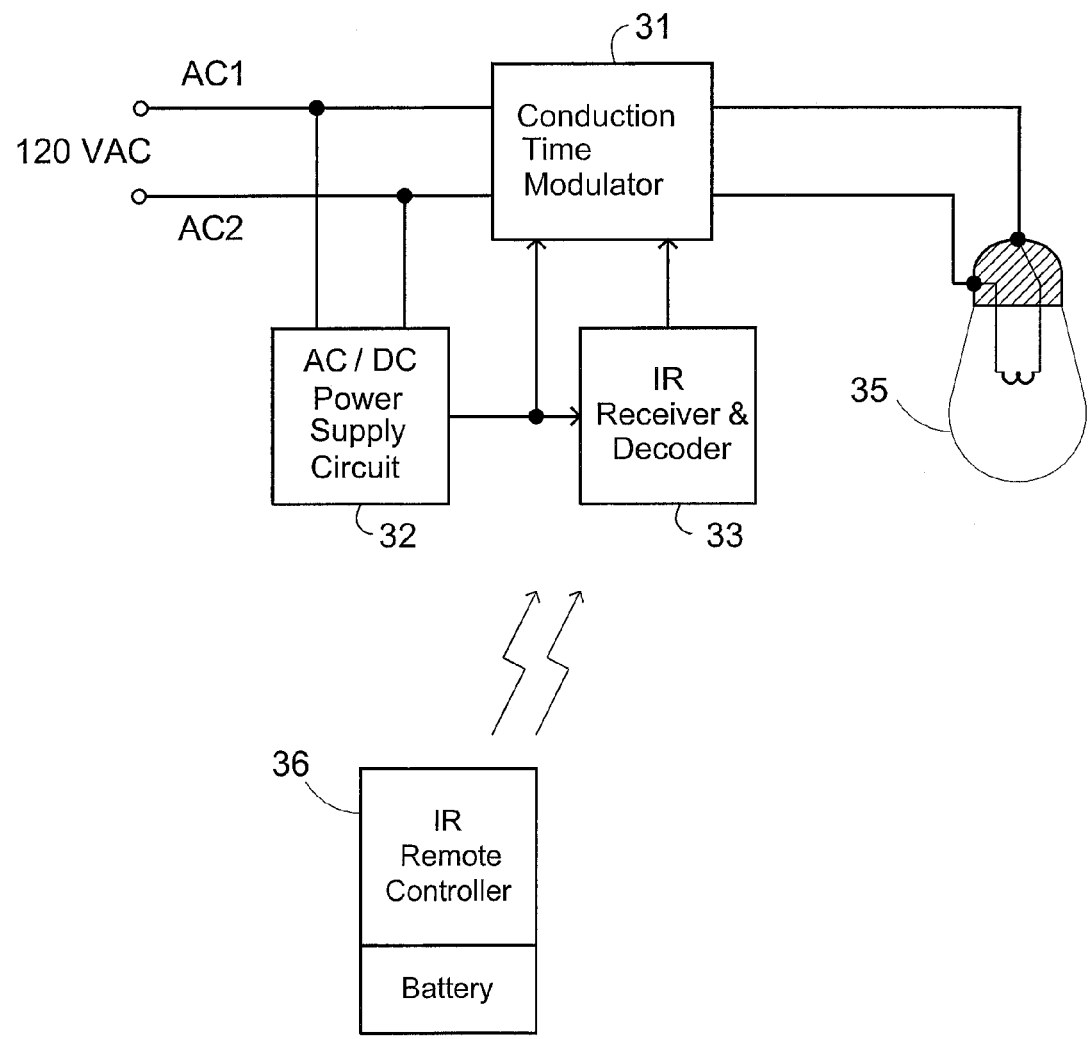
FIG. 3 is a schematic diagram showing a conventional remote control dimming circuit.

Reference will now be made in detail to the present embodiments of the invention, examples of which are illustrated in the accompanying drawings. Wherever possible, the same reference numbers are used in the drawings and the description to refer to the same or like parts.

Figure 6:
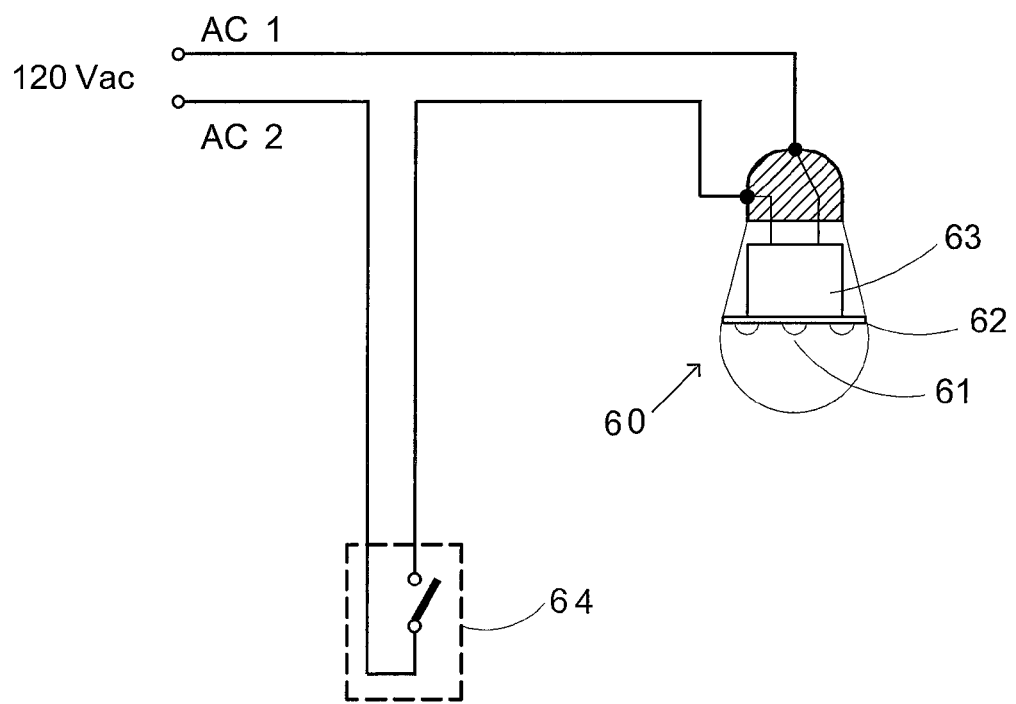
FIG. 6 is a schematic diagram showing an LED lamp according to an embodiment of the present invention.

FIG. 6 is a schematic diagram showing an LED lamp 60 with wall-switch controlled dimming function according to an embodiment of the present invention. Lamp 60 includes an LED light source 61, a heat-sink substrate 62, and a driver circuit 63. LED light source 61 is a string of high-brightness LEDs mounted on heat-sink substrate 62. Driver circuit 63 converts the AC power into a DC operating current to drive LED light source 61. Driver circuit 63 includes a dimming circuit controlled by the toggle action of wall switch 64.

Figure 7:
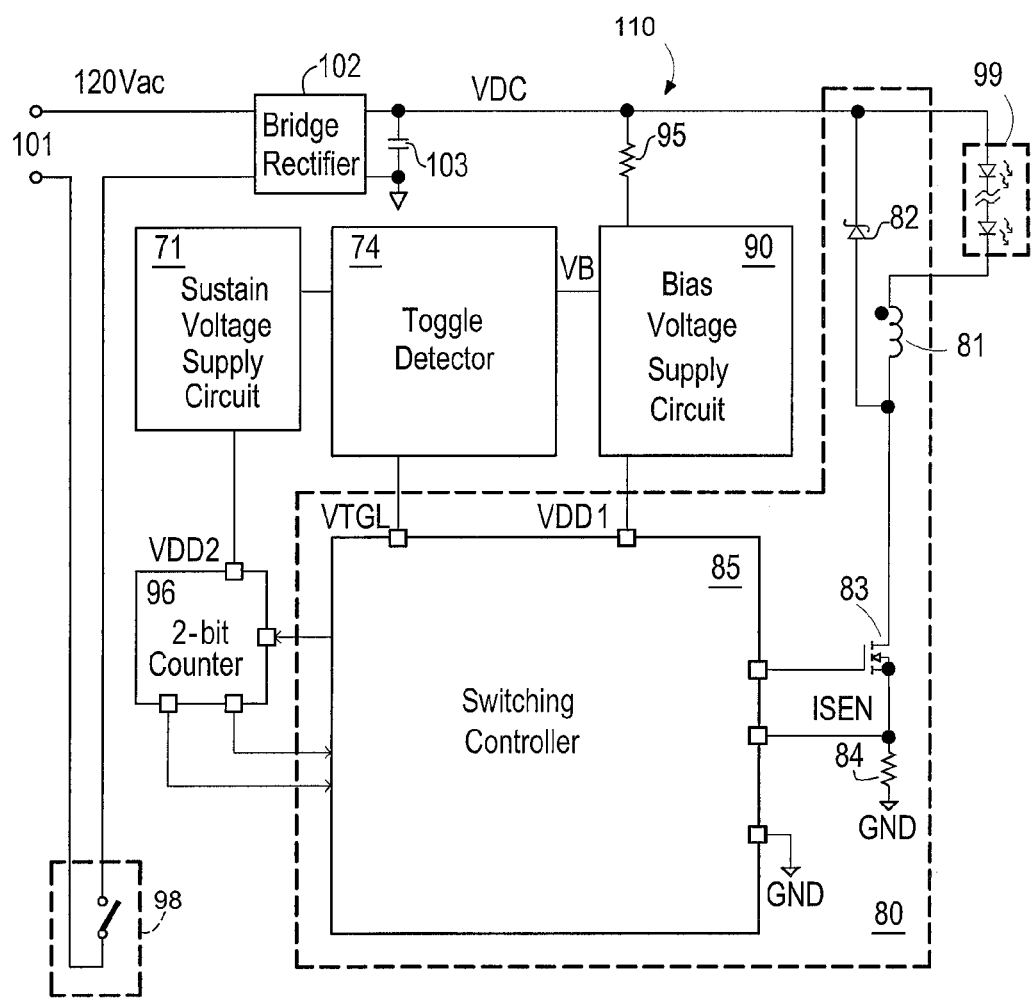
FIG. 7 is another schematic diagram showing the LED lamp in FIG. 6.

FIG. 7 is a schematic diagram showing an LED lamp 110 that has the same wall-switch controlled dimming function as that of the LED lamp 60 in FIG. 6. LED lamp 110 includes a bridge rectifier 102, a capacitor 103, a start up resistor 95, a bias voltage supply circuit 90, a toggle detector 74, a sustain voltage supply circuit 71, a counter 96, an LED light source 99, and an LED lighting driver 80. Bridge rectifier 102 receives a source AC voltage from the AC line 101 through a wall switch 98 and provides a rectified DC voltage VDC. Capacitor 103 filters ripples and noises out from rectified DC voltage VDC. Start up resistor 95 serves the same purpose as the resistor Rst in FIG. 4 does. Bias voltage supply circuit 90 provides a bias AC voltage VB and a bias DC voltage VDD1. LED lighting driver 80 receives bias DC voltage VDD1 for operation. Toggle detector 74 monitors the toggle action of wall switch 98. Sustain voltage supply circuit 71 provides a sustain voltage VDD2. In this embodiment, counter 96 is a two-bit counter that receives sustain voltage VDD2 for operation. In addition, counter 96 stores and provides an counting value that changes when toggle detector 74 detects the toggle action of wall switch 98. LED lighting driver 80 converts rectified DC voltage VDC to a constant current to drive LED light source 99. LED lighting driver 80 provides multi-level dimming to LED light source 99 according to the counting value provided by counter 96.

LED lighting driver 80 includes an inductor 81, a free-wheeling diode 82, a power MOSFET 83, a sense resistor 84, and a switching controller 85. Inductor 81 is coupled to LED light source 99. Free-wheeling diode 82 has an anode coupled to inductor 81 and a cathode coupled to rectified DC voltage VDC and LED light source 99. Power MOSFET 83 is coupled to inductor 81 and the anode of diode 82. Sense resistor 84 is coupled between power MOSFET 83 and the ground GND.

Figure 4:
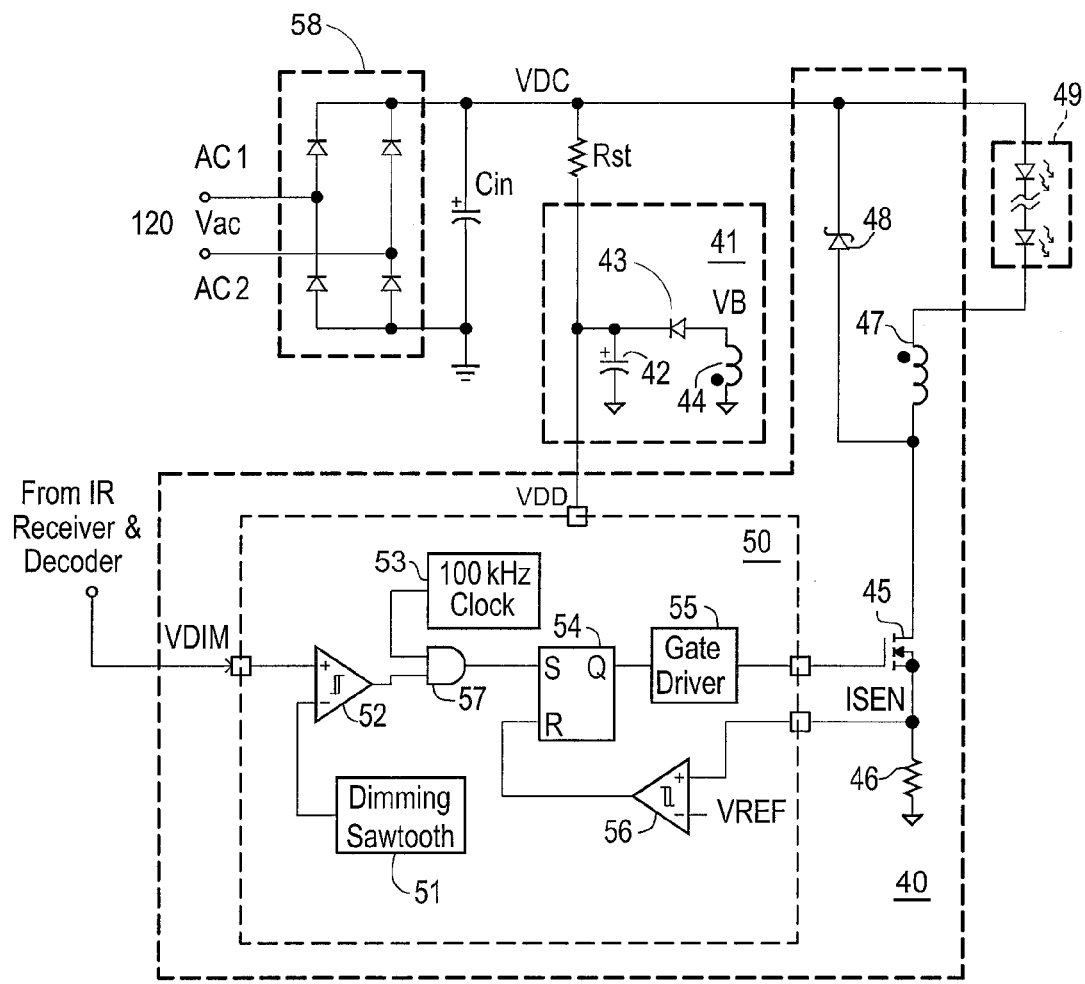
FIG. 4 is a schematic diagram showing a conventional LED lamp driving circuit.
Figure 5:
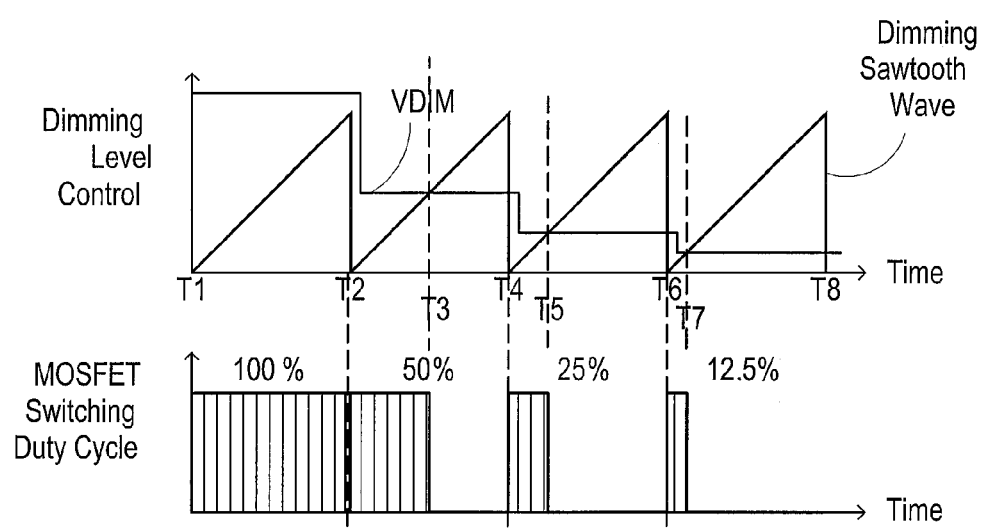
FIG. 5 is a schematic diagram showing some important signals in the LED lamp driving circuit in FIG. 4.

Inductor 81, free-wheeling diode 82, power MOSFET 83, and sense resistor 84 serve the same function as their counterparts in FIG. 4 do. LED lighting driver 80 is a buck converter. When power MOSFET 83 is turned on, the voltage across inductor 81 is positive. The current through LED light source 99 and inductor 81 increases accordingly. The current ISEN provides the same feedback as that in FIG. 4. When power MOSFET 83 is turned off, the voltage across inductor 81 becomes negative due to the constant voltage drop across diode 82 and LED light source 99. The current through LED light source 99 and inductor 81 decreases accordingly. The very rapid switching of power MOSFET 83 makes the current through LED light source 99 substantially constant. Switching controller 85 receives bias DC voltage VDD1 for operation. Switching controller 85 controls the multi-level dimming of LED light source 99 by controlling the switching duty cycle of power MOSFET 83 according to the counting value provided by counter 96.

Figure 8:
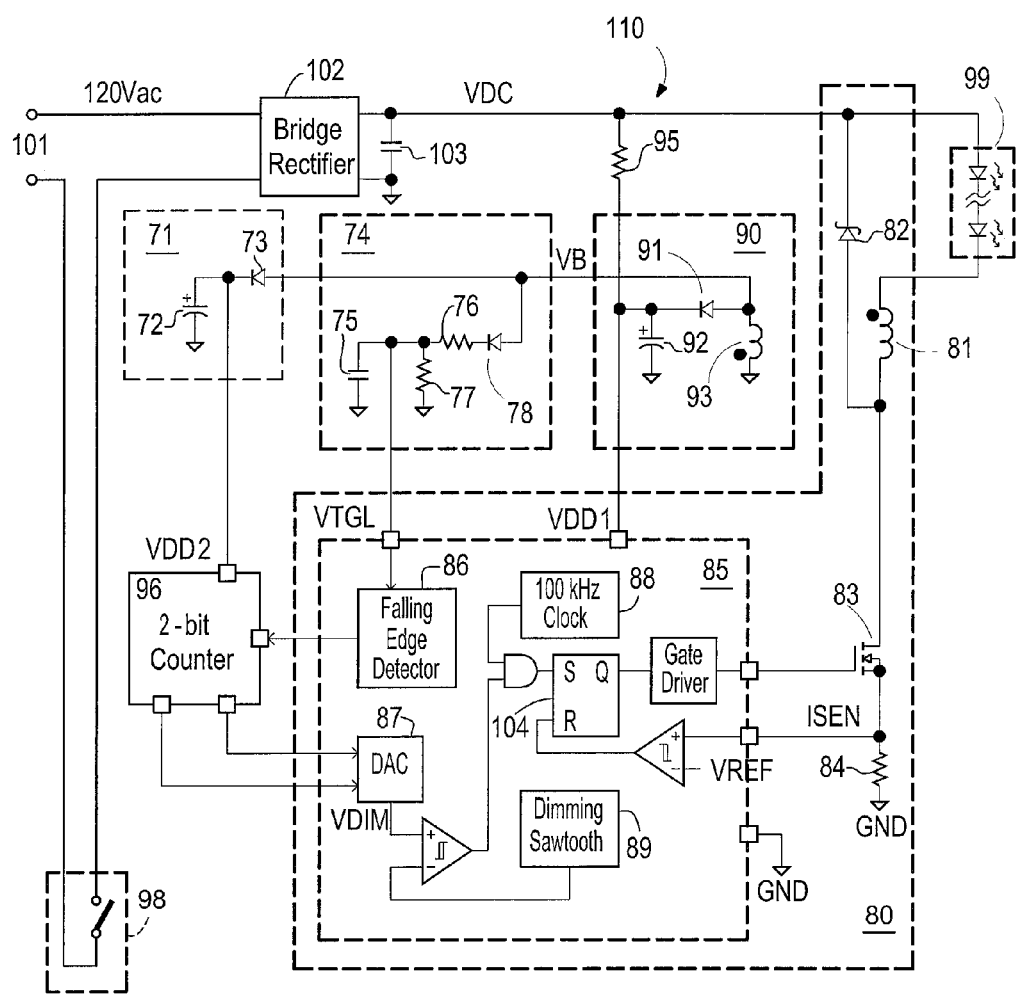
FIG. 8 is a more detailed schematic diagram showing the LED lamp in FIG. 7.

FIG. 8 is a more detailed schematic diagram showing the dimmable LED lamp 110 in FIG. 7. Bias voltage supply circuit 90 includes a bias winding 93, a rectifier diode 91, and a filter capacitor 92. Inductor 81 and bias winding 93 are coupled electro-magnetically via a common magnetic core. When power MOSFET 83 is switching, an AC voltage is developed across inductor 81. This induces a proportional AC voltage across winding 93. In other words, bias winding 93 provides the bias AC voltage VB by receiving power from inductor 81. Rectifier diode 91 rectifies bias AC voltage VB. Capacitor 92 filters out ripples in the rectified bias AC voltage VB. The result of the filtering is stored in capacitor 92 as the bias DC voltage VDD1 and provided to LED lighting driver 80 to maintain switching controller 85 in a standby mode even when the switching operation of LED lighting driver 80 is suspended during a PWM dimming mode. When switch 98 is turned on initially, the rectified DC voltage VDC charges capacitor 92 through start up resistor 95. LED lighting driver 80 starts up when the bias DC voltage VDD1 reaches the specified level (for example, 5V or 10V).

Toggle detector 74 includes a set of resistor voltage divider 76 and 77, a rectifier diode 78, and a filter capacitor 75. Diode 78 rectifies bias AC voltage VB. Resistor voltage divider 76 and 77 divide the rectified bias AC voltage VB. Capacitor 75 helps to filter out voltage ripple caused by the PWM dimming at a minimum dimming frequency. Capacitor 75 provides the result of the filtering as the toggle voltage VTGL. Toggle detector 74 monitors the presence (or absence) of bias AC voltage VB on winding 93. If wall switch 98 is turned off for a moment, the switching of MOSFET 83 stops. Bias winding 93 no longer supplies power (i.e., bias AC voltage VB) to capacitor 75. The toggle voltage VTGL across capacitor 75 is discharged via resistor 77 to zero in less than 100 ms. A falling edge detector 86 included in switching controller 85 receives and monitors toggle voltage VTGL. When falling edge detector 86 detects that toggle voltage VTGL becomes lower than a predetermined threshold, falling edge detector 86 outputs a trigger signal to counter 96. Counter 96 changes the counting value to count up by one in response to the trigger signal.

Sustain voltage supply circuit 71 also receives energy from bias winding 93. Diode 73 rectifies the bias AC voltage VB. Capacitor 72 filters out ripples in the rectified bias AC voltage VB and provides the result of the filtering as the sustain voltage VDD2. Counter 96 is supported by sustain voltage supply circuit 71. Counter 96 is an ultra-low power CMOS logic, typically uses less than 1 uA of current. Capacitor 72 can keep the sustain voltage VDD2 high enough for counter 96 to maintain its counting value for at least two seconds after LED lighting driver 80 stops switching. The current consumption by switching controller 85 is typically a few mA, hundreds times more than that of two-bit counter 96. Therefore, diode 73 is necessary to prevent switching controller 85 from drawing current out of capacitor 72.

Toggle detector 74 can keep toggle voltage VTGL higher than the predetermined threshold of falling edge detector 86 until a first time duration after wall switch 98 is turned off. Bias voltage supply circuit 90 can provide bias DC voltage VDD1 to switching controller 85 until a second time duration after wall switch 98 is turned off. The sustain voltage VDD2 provided by sustain voltage supply circuit 71 can maintain the counting value stored in counter 96 until a third time duration after wall switch 98 is turned off. The second time duration is longer than the first time duration and the third time duration is longer than the second time duration. For example, the first, second, and third time durations may be 1 millisecond, 100 milliseconds, and 2 seconds, respectively. Consequently, the user can adjust the dimming level of LED lamp 110 as long as he/she turns off and then turns on wall switch 98 in a time span between the second time duration and the third time duration. If the aforementioned time span is longer than the third time duration, counter 96 would lose its counting value due to absence of sustain voltage VDD2 and the dimming level of LED lamp 110 would be reset to the initial level.

Switching controller 85 includes a digital-to-analog converter (DAC) 87. DAC 87 converts the counting value of counter 96 into a dimming voltage VDIM. Dimming voltage VDIM decreases as the counting value increases. By a controlling mechanism similar to that of switching controller 50 in FIG. 4, switching controller 85 drives power MOSFET 83 so that the switching duty cycle of power MOSFET 83 is directly proportional to the dimming voltage VDIM. As a result, when counter 96 increases its counting value, LED lighting driver 80 provides less power to LED light source 99 in response.

Although the counting value of counter 96 consists of only two bits in this embodiment, the counting value may contain more bits in some other embodiments of the present invention, thus supporting more dimming levels and enabling more fine-grained dimming level control.

Except falling edge detector 86 and DAC 87, the other components of switching controller 85 and LED lighting driver 80 serve the same functions as their counterparts in FIG. 4. Therefore, the other components are not repeatedly discussed here.

In the various embodiments of the present invention, LED lighting driver 80 may be a pulse-width modulation (PWM) converter or a pulse-frequency modulation (PFM) converter. In addition, LED lighting driver 80 may be a buck converter, a forward converter, or a flyback converter in topology.

Figure 9:
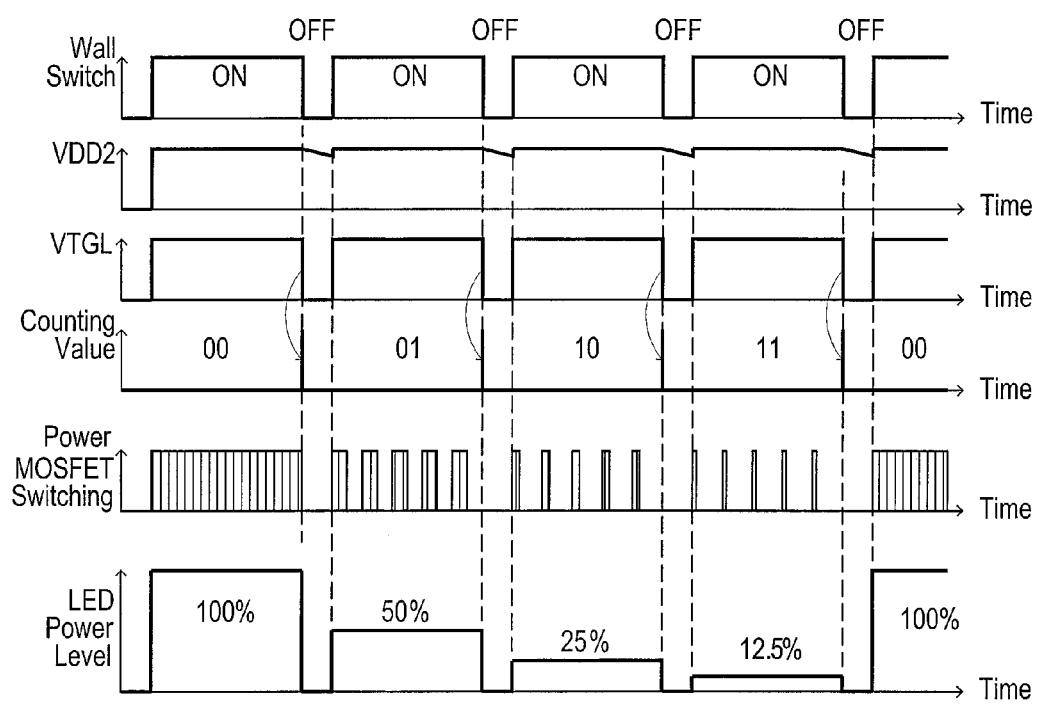
FIG. 9 is a schematic diagram showing some important signals and operations of the LED lamp in FIG. 8.

As shown in FIG. 9, when wall switch 98 powers up LED lamp 110 for the first time, the counting value of counter 96 is cleared to 00. This 00-state sets up switching controller 85 to operate at PWM dimming level of 100%, that is, LED lighting driver 80 is never inhibited.

Each consecutive toggle of wall switch 98 causes counter 96 to count up by one. After the first toggle, the counting value enters 01-state. Accordingly, the switching duty cycle of power MOSFET 83 is reduced to 50%. The second toggle makes the counting value to enter 10-state, corresponding to a switching duty cycle of 25%. The third toggle makes the counting value to enter 11-state, corresponding to a switching duty cycle of 12.5%. The fourth toggle makes the counting value back to 00-state and 100% switching duty cycle again.

However, if wall switch 98 is turned off for many seconds, sustain voltage VDD2 provided by sustain voltage supply circuit 71 would drop to a very low value such that 2-bit counter 96 would lose its counting value. When wall switch 98 is turned on again, counter 96 would reset the counting value to 00-state. LED lighting driver 80 would operate at a 100% dimming duty cycle.

Figure 10:
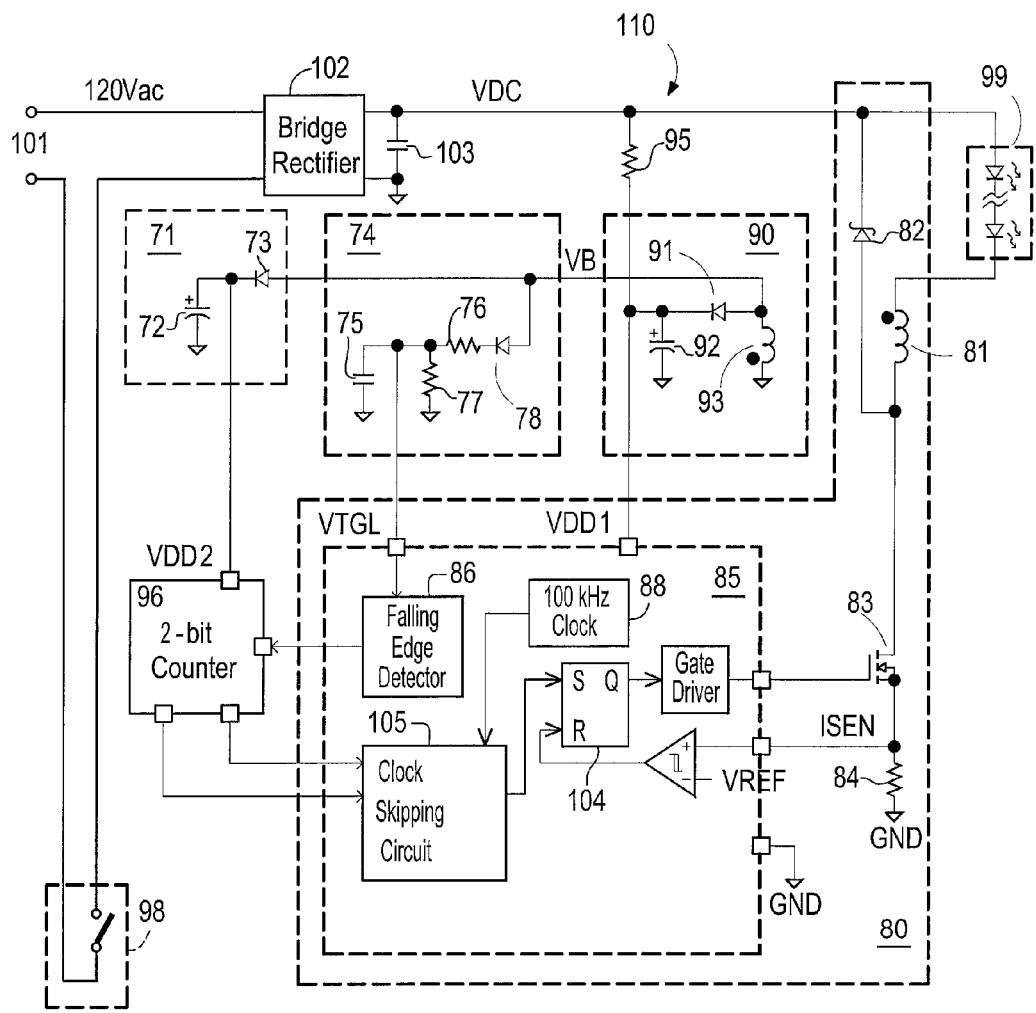
FIG. 10 is a schematic diagram showing another LED lamp according to another embodiment of the present invention.

FIG. 10 is a schematic diagram showing an alternative design of the switching controller 85 in FIG. 7 and FIG. 8. In FIG. 10, switching controller 85 includes a clock generator 88 and a clock skipping circuit 105. Clock generator 88 provides a clock signal. Clock skipping circuit 105 skips a number of pulses in the clock signal according to the counting value provided by counter 96. The number of the skipped pulses increases along with the counting value. For example, clock skipping circuit 105 does not skip any clock pulse when the two-bit counting value is 00. Clock skipping circuit 105 skips 4 pulses in each batch of 8 consecutive clock pulses when the two-bit counting value is 01. Clock skipping circuit 105 skips 6 pulses in each batch of 8 consecutive clock pulses when the two-bit counting value is 10. Clock skipping circuit 105 skips 7 pulses in each batch of 8 consecutive clock pulses when the two-bit counting value is 11. Clock skipped circuit 105 provides the skipped clock signal to SR slip-flop 104. Each un-skipped pulse in the clock signal sets the output of SR flip-flop 104 and makes power MOSFET 83 switches once in response. In this way, the switching controller 85 in FIG. 10 achieves the same function as the switching controller 85 in FIG. 8 does.

In addition to LED lamp 110, the aforementioned embodiments of the present invention provide a dimmable LED lighting apparatus as well. This dimmable LED lighting apparatus may include the aforementioned sustain voltage supply circuit 71, toggle detector 74, bias voltage supply circuit 90, LED lighting driver 80, and counter 96 in FIG. 7, FIG. 8, or FIG. 10.

In summary, the present invention utilizes a low-power counter to store the dimming level value desired. The dimming level is instructed by the number of wall switch toggles after the LED lamp is initially turned on. Further, the low-power counter is kept alive by a sustain voltage supply circuit when the wall switch is turned off momentarily as part of the toggle action. Furthermore, the sustain voltage supply circuit receives its power from the bias winding of the bias voltage supply circuit. Thus, the present invention achieves the goal of a low-cost LED lighting dimming control. It requires only a toggle detector, a sustain voltage supply circuit, and a counter. All the components for these circuits can be easily integrated into conventional LED lamp driver circuits.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dimmable light-emitting diode (LED) lamp, comprising:
   a bridge rectifier, receiving a source alternating current (AC) voltage through a wall switch and providing a rectified direct current (DC) voltage;
   a toggle detector, monitoring a toggle action of the wall switch;
   a sustain voltage supply circuit, providing a sustain voltage according to a bias AC voltage, wherein the bias AC voltage is a induced voltage and provided only when the wall switch is turned on;
   a counter, receiving the sustain voltage for operation, storing and providing an counting value that changes when the toggle detector detects the toggle action of the wall switch;
   an LED light source;
   an LED lighting driver, converting the rectified DC voltage to a constant current to drive the LED light source and providing multi-level dimming to the LED light source according to the counting value, wherein the LED lighting driver comprises:
      an inductor, coupled to the LED light source;
      a free-wheeling diode, comprising an anode coupled to the inductor and a cathode coupled to the rectified DC voltage and the LED light source
      a power metal-oxide-semiconductor field-effect transistor (MOSFET), coupled between the anode of the free-wheeling diode and a ground; and
      a switching controller, receiving the bias DC voltage for operation and controlling the multi-level dimming by controlling a switching duty cycle of the power MOSFET according to the counting value; and
   a bias voltage supply circuit, providing the bias AC voltage and a bias DC voltage, rectifying the bias AC voltage and filters out ripples in the rectified bias AC voltage and, providing a result of the filtering as the bias DC voltage to be received by the LED lighting driver for operation, and comprises a bias winding electro-magnetically coupled to the inductor via sharing a common magnetic core, the bias winding provides the bias AC voltage by receiving power from the inductor when the MOSFET is switching.

2. The dimmable LED lamp of claim 1, wherein the toggle detector monitors the toggle action of the wall switch by sensing an absence of the bias AC voltage on the bias winding.

3. The dimmable LED lamp of claim 2, wherein the toggle detector rectifies the bias AC voltage and filters out ripples in the rectified bias AC voltage and provides a result of the filtering as a toggle voltage, the counter changes the counting value in response to a decrease in the toggle voltage.

4. The dimmable LED lamp of claim 3, wherein the toggle detector rectifies the bias AC voltage, divides the rectified bias AC voltage, filters out ripples in the divided bias AC voltage, and provides a result of the filtering as the toggle voltage.

5. The dimmable LED lamp of claim 3, wherein the switching controller further comprises:
   a falling edge detector, receiving the toggle voltage and outputting a trigger signal to the counter when the toggle voltage becomes lower than a predetermined threshold, the counter changes the counting value in response to the trigger signal.

6. The dimmable LED lamp of claim 5, wherein the toggle detector keeps the toggle voltage higher than the predetermined threshold until a first time duration after the wall switch is turned off, the bias voltage supply circuit provides the bias DC voltage to the switching controller until a second time duration after the wall switch is turned off, the sustain voltage provided by the sustain voltage supply circuit maintains the counting value stored in the counter until a third time duration after the wall switch is turned off, the second time duration is longer than the first time duration and the third time duration is longer than the second time duration.

7. The dimmable LED lamp of claim 1, wherein the switching controller further comprises:
   a digital-to-analog converter (DAC), converting the counting value into a dimming voltage, wherein the dimming voltage decreases as the counting value increases and the switching duty cycle of the power MOSFET is directly proportional to the dimming voltage.

8. The dimmable LED lamp of claim 1, wherein the switching controller further comprises:
   a clock generator, providing a clock signal; and
   a clock skipping circuit, skipping a number of pulses in the clock signal according to the counting value, wherein the number of the skipped pulses increases along with the counting value and the power MOSFET switches once in response to each un-skipped pulse of the clock signal.

9. A dimmable light-emitting diode (LED) lighting apparatus, comprising:
   a toggle detector, monitoring a toggle action of a wall switch that controls a rectified direct current (DC) voltage;
   a sustain voltage supply circuit, providing a sustain voltage according to a bias AC voltage, wherein the bias AC voltage is a induced voltage and provided only when the wall switch is turned on;
   a counter, receiving the sustain voltage for operation, storing and providing an counting value that changes when the toggle detector detects the toggle action of the wall switch;
   an LED lighting driver, converting the rectified DC voltage to a constant current to drive an LED light source and providing multi-level dimming to the LED light source according to the counting value, wherein the LED lighting driver comprises:
      an inductor, coupled to the LED light source;
      a free-wheeling diode, comprising an anode coupled to the inductor and a cathode coupled to the rectified DC voltage and the LED light source
      a power metal-oxide-semiconductor field-effect transistor (MOSFET), coupled between the anode of the free-wheeling diode and a ground; and
      a switching controller, receiving the bias DC voltage for operation and controlling the multi-level dimming by controlling a switching duty cycle of the power MOSFET according to the counting value; and
   a bias voltage supply circuit, providing the bias AC voltage and a bias DC voltage, rectifying the bias AC voltage and filters out ripples in the rectified bias AC voltage and, providing a result of the filtering as the bias DC voltage to be received by the LED lighting driver for operation, and comprises a bias winding electro-magnetically coupled to the inductor via sharing a common magnetic core, the bias winding provides the bias AC voltage by receiving power from the inductor when the MOSFET is switching.

10. The dimmable LED lighting apparatus of claim 9, wherein the toggle detector monitors the toggle action of the wall switch by sensing an absence of the bias AC voltage on the bias winding.

11. The dimmable LED lighting apparatus of claim 10, wherein the toggle detector rectifies the bias AC voltage and filters out ripples in the rectified bias AC voltage and provides a result of the filtering as a toggle voltage, the counter changes the counting value in response to a decrease in the toggle voltage.

12. The dimmable LED lighting apparatus of claim 11, wherein the switching controller further comprises:
   a falling edge detector, receiving the toggle voltage and outputting a trigger signal to the counter when the toggle voltage becomes lower than a predetermined threshold, the counter changes the counting value in response to the trigger signal.

13. The dimmable LED lighting apparatus of claim 12, wherein the toggle detector keeps the toggle voltage higher than the predetermined threshold until a first time duration after the wall switch is turned off, the bias voltage supply circuit provides the bias DC voltage to the switching controller until a second time duration after the wall switch is turned off, the sustain voltage provided by the sustain voltage supply circuit maintains the counting value stored in the counter until a third time duration after the wall switch is turned off, the second time duration is longer than the first time duration and the third time duration is longer than the second time duration.

14. The dimmable LED lighting apparatus of claim 9, wherein the switching controller further comprises:
   a digital-to-analog converter (DAC), converting the counting value into a dimming voltage, wherein the dimming voltage decreases as the counting value increases and the switching duty cycle of the power MOSFET is directly proportional to the dimming voltage.

15. The dimmable LED lighting apparatus of claim 9, wherein the switching controller further comprises:
   a clock generator, providing a clock signal; and
   a clock skipping circuit, skipping a number of pulses in the clock signal according to the counting value, wherein the number of the skipped pulses increases along with the counting value and the power MOSFET switches once in response to each un-skipped pulse of the clock signal.

* * * * *